United States Patent
Kanevsky et al.

(10) Patent No.: US 8,464,350 B2
(45) Date of Patent: Jun. 11, 2013

(54) SYSTEM AND METHOD FOR IN-PRIVATE BROWSING

(75) Inventors: Dimitri Kanevsky, Ossining, NY (US); James R. Kozloski, New Fairfield, CT (US); Clifford A. Pickover, Yorktown Heights, NY (US); Tara N. Sainath, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 13/047,764

(22) Filed: Mar. 14, 2011

(65) Prior Publication Data

US 2012/0240237 A1     Sep. 20, 2012

(51) Int. Cl.
    *G06F 17/30* (2006.01)
(52) U.S. Cl.
    USPC .......................................... 726/26
(58) Field of Classification Search
    USPC .......................................... 726/26
    See application file for complete search history.

(56) References Cited

U.S. PATENT DOCUMENTS

| | | | | |
|---|---|---|---|---|
| 2010/0191799 A1* | 7/2010 | Fiedorowicz et al. | | 709/203 |
| 2011/0167492 A1* | 7/2011 | Ghosh et al. | | 726/23 |
| 2012/0185947 A1* | 7/2012 | Phillips et al. | | 726/26 |
| 2012/0185949 A1* | 7/2012 | Phillips et al. | | 726/26 |
| 2012/0198524 A1* | 8/2012 | Celebisoy | | 726/5 |

OTHER PUBLICATIONS

Ramesh Srinivasan, "Start Internet Explorer 8 in InPrivate Mode Using the Start Menu Internet Icon", http://www.winhelponline.com/blog/start-ie8-inprivate-using-start-menu-internet-icon/ (printed Jan. 11, 2011) pp. 1-4.

My Digital Life "Create a Shortcut to Open IE8 Browser in InPrivate Mode", http://www.mydigitallife.info/2008/10/11/create-a-shortcut-to-open-ie8-browser-in-inprivate-mode/ (printed Jan. 11, 2011) pp. 1-11.

fryan0911.com "Automatic start Google Chrome in Incognito mode", http://www.fryan0911.com/2009/08/automatic-start-google-chrome-in.html (printed Jan. 11, 2011) pp. 1-3.

\* cited by examiner

*Primary Examiner* — Cordelia Zecher
(74) *Attorney, Agent, or Firm* — Ido Tuchman; Louis J. Percello

(57) ABSTRACT

A method, system, and computer program product for operating a web browser in an open browsing mode and a private browsing mode. The method may include calculating, by a computer processor, a privacy probability that a website contains information sensitive to the user. The privacy probability may be based, at least in part, on historical use of the private browsing mode by the user. The method may also include comparing the privacy probability to a privacy threshold and automatically switching the browser from the open browsing mode to the private browsing mode for the website if the privacy probability is greater than the privacy threshold.

25 Claims, 6 Drawing Sheets

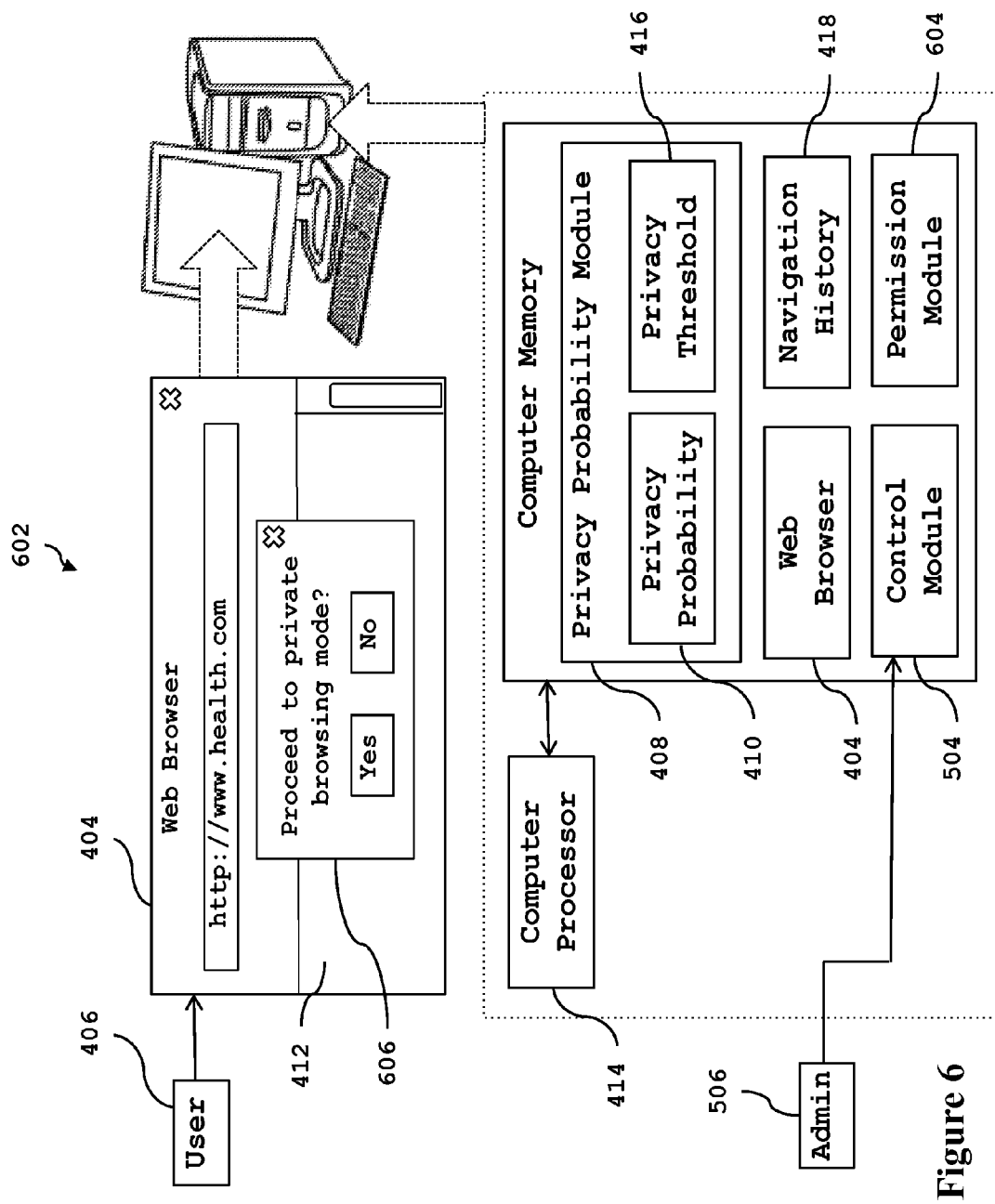

SYSTEM AND METHOD FOR IN-PRIVATE BROWSING

BACKGROUND

This invention involves the operation of web browsers. Specifically, the invention involves the management of privacy settings while a user operates a web browser.

Web browsers such as Firefox, Internet Explorer, Safari, Google Chrome, Opera and others generally store historical information about the browser's usage. Web browsers may also provide various options for information privacy related to information stored by the web browser on the user's computing device. Users may be able to enable these settings temporarily by manually turning on a private browsing mode. Typically, the user must then manually turn off the private browsing mode to return to less restrictive settings, or the user may close the web browser window or browser tab and restart the browser or browser tab in another mode.

BRIEF SUMMARY

An example embodiment of the present invention is a method for operating a web browser by a user. The browser includes an open browsing mode and a private browsing mode. The method includes calculating, by a computer processor, a privacy probability that a website contains information sensitive to the user. The privacy probability may be based, at least in part, on historical use of the private browsing mode by the user. The method includes comparing the privacy probability to a privacy threshold. The method also includes automatically switching the browser from the open browsing mode to the private browsing mode for the website if the privacy probability is greater than the privacy threshold.

Another example embodiment of the present invention is a system for operating a web browser by a user. The browser includes an open browsing mode and a private browsing mode. The system includes a privacy probability module configured to calculate a privacy probability that a website contains information sensitive to the user. The privacy probability may be based, at least in part, on historical use of the private browsing mode by the user. The system also includes a computer processor configured to compare the privacy probability to a privacy threshold and automatically switch the browser from the open browsing mode to the private browsing mode for the website if the privacy probability is greater than the privacy threshold.

Yet another example embodiment of the invention is a computer program product for operating a web browser by a user. The browser includes an open browsing mode and a private browsing mode. The computer program product includes a computer readable storage medium having computer readable program code embodied therewith. The computer readable program code is configured to calculate, by a computer processor, a privacy probability that a website contains information sensitive to the user. The privacy probability may be based, at least in part, on historical use of the private browsing mode by the user. The computer readable program code is configured to compare the privacy probability to a privacy threshold. The computer readable program code is also configured to automatically switch the browser from the open browsing mode to the private browsing mode for the website if the privacy probability is greater than the privacy threshold.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

The present invention is described with reference to embodiments of the invention. Throughout the description of the invention reference is made to FIGS. 1-5.

As discussed in detail below, embodiments of the present invention include a method, system, and computer program product to operate a web browser by calculating a privacy probability and automatically switching in to private browsing mode when the privacy probability reaches a privacy threshold.

Figure 1:
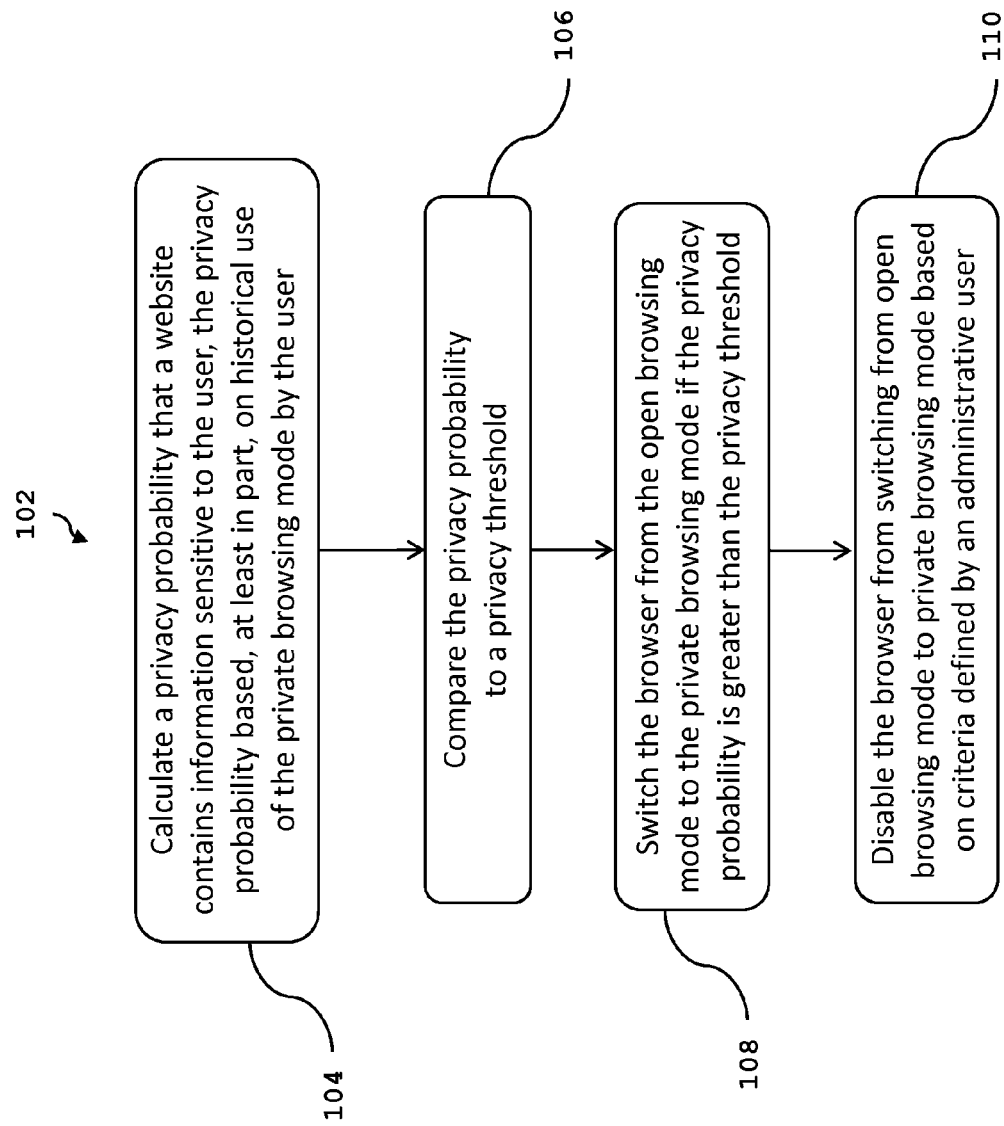
FIG. 1 shows an example embodiment of a method for operating a web browser by a user that may include calculating, comparing, switching and disabling steps.

FIG. 1 shows an example embodiment of a method 102 for operating a web browser by a user. The browser may include an open browsing mode and a private browsing mode. In one embodiment, a browser navigation history is not encrypted in the open browsing mode, and the browser navigation history is encrypted in the private browsing mode. The method 102 may included a calculating step 104 of calculating, by a computer processor, a privacy probability that a website contains information sensitive to the user. The privacy probability may be based, at least in part, on historical use of the private browsing mode by the user. In one embodiment, method 102 includes a comparing step 106 of comparing the privacy probability to a privacy threshold. The method 102 may also include a switching step 108 of automatically switching the browser from the open browsing mode to the private browsing mode for the website if the privacy probability is greater than the privacy threshold.

In one embodiment of method 102, a browser navigation history may not be encrypted in the open browsing mode, and the browser navigation history may be encrypted in the private browsing mode. In private browsing mode the browser navigation history may stored in an encrypted database configured to at least delete the browser navigation history, at least in part, after a specified period of time or delete the browser navigation history during an unauthorized attempt to access the browser navigation history. In another embodiment of method 102, a browser navigation history may be automatically saved in the open browsing mode, and the browser navigation history may be automatically deleted in the private browsing mode. The browser navigation history is described in more detail below.

In one embodiment of method 102, the historical use of the private browsing mode is based on, at least in part, a set of adjustable preferences. In particular, the application of the private browsing mode over past and current browser navigation history may be based on, at least in part, a set of adjustable preferences. In one embodiment of method 102, calculating the privacy probability includes receiving a search term typed by the user. Calculating the privacy probability may include receiving a signal from a device measuring a biological response from the user. In one embodiment of method 102, calculating the privacy probability may include receiving a code indicating that the website is to be viewed in private browsing mode.

In one embodiment, method 102 further includes a disabling step 110 of disabling the browser from switching from the open browsing mode to the private browsing mode based on criteria defined by an administrative user.

Figure 2:
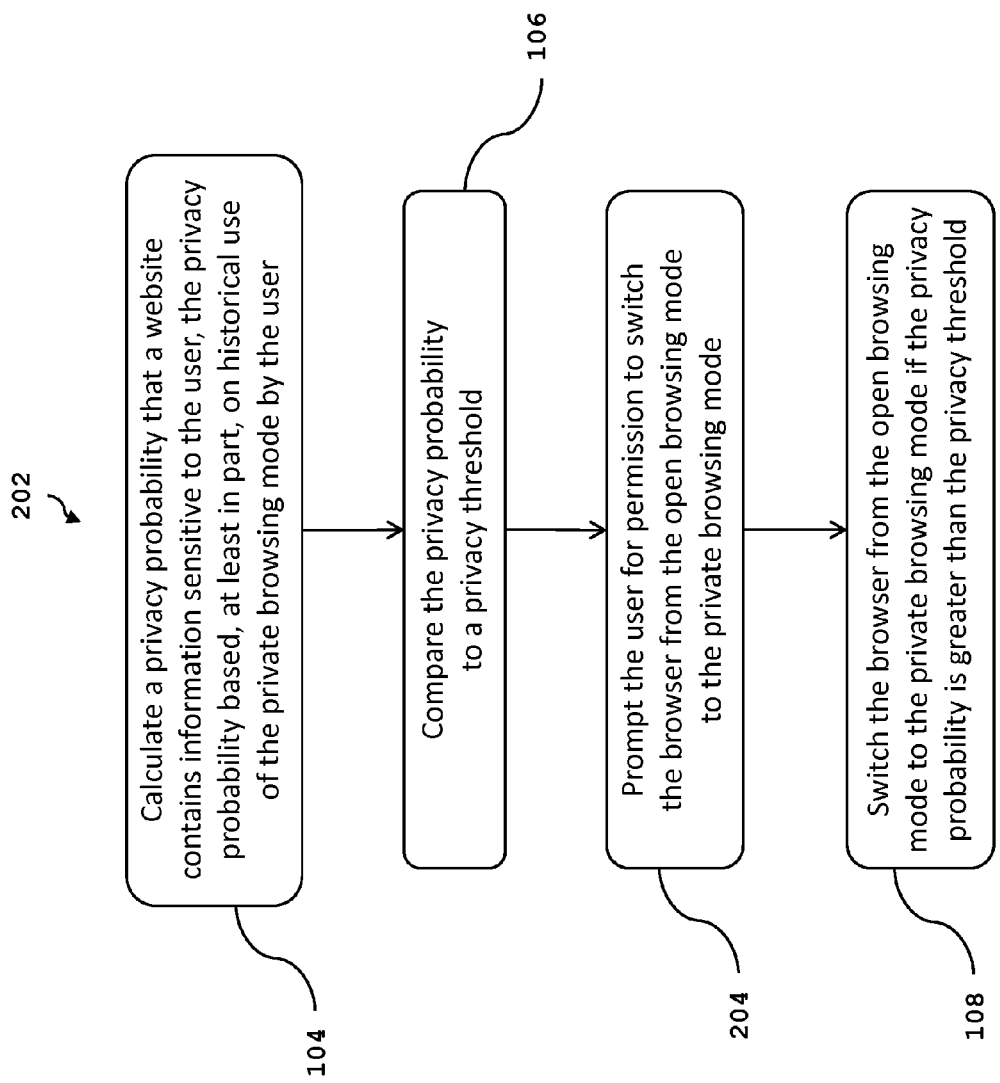
FIG. 2 shows an example embodiment of a method for operating a web browser by a user that may include calculating, comparing, prompting, and switching steps.

FIG. 2 shows an example embodiment of a method 202. The method 202 includes steps 104, 106 and 108 of method 102. The method additionally includes a prompting step 204 of prompting the user for permission to switch the browser from the open browsing mode to the private browsing mode before automatically switching the browser from the open browsing mode to the private browsing mode.

Figure 3:
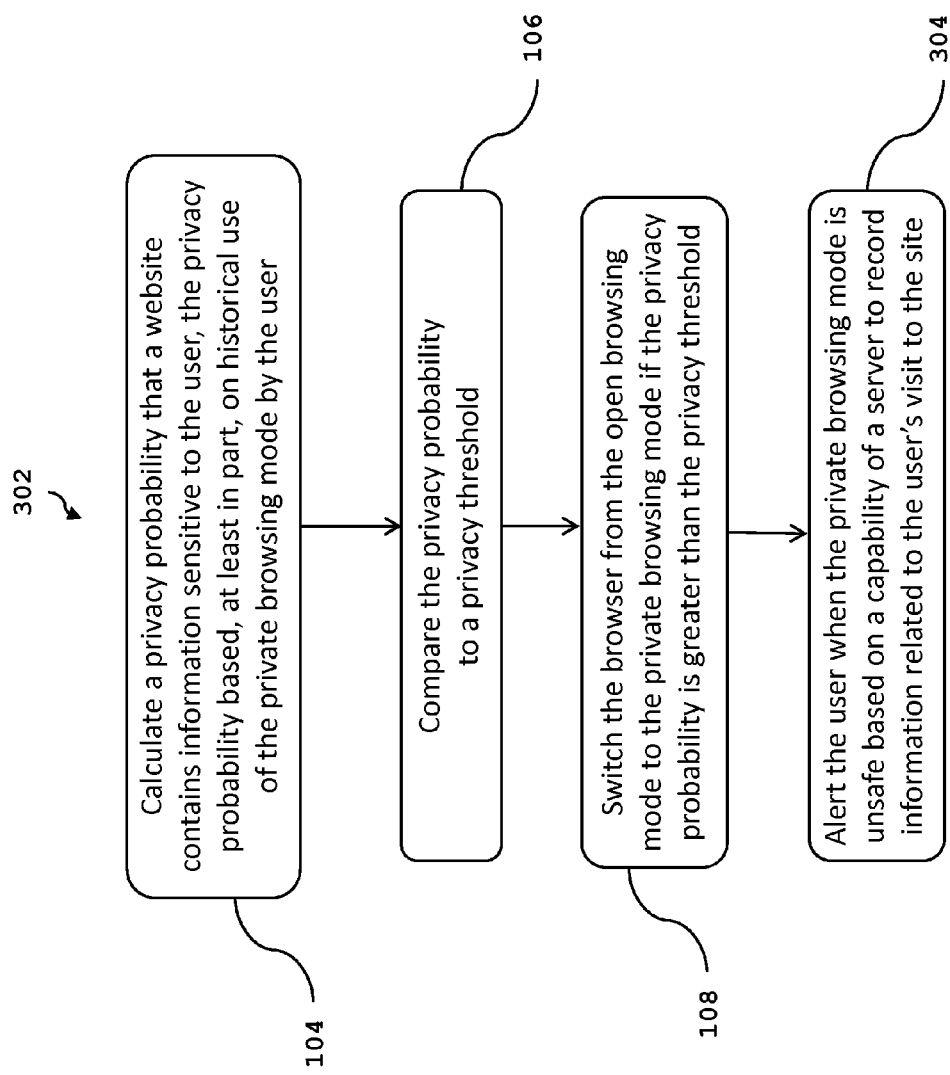
FIG. 3 shows an example embodiment of a method for operating a web browser by a user that may include calculating, comparing, switching and alerting steps.

FIG. 3 shows an example embodiment of a method 302. The method 302 includes steps 104, 106 and 108 of method 102. The method additionally includes an alerting step 304 of alerting the user when the private browsing mode may be unsafe based on the capability of a server to record information related to the user's visit to the website.

Figure 4:
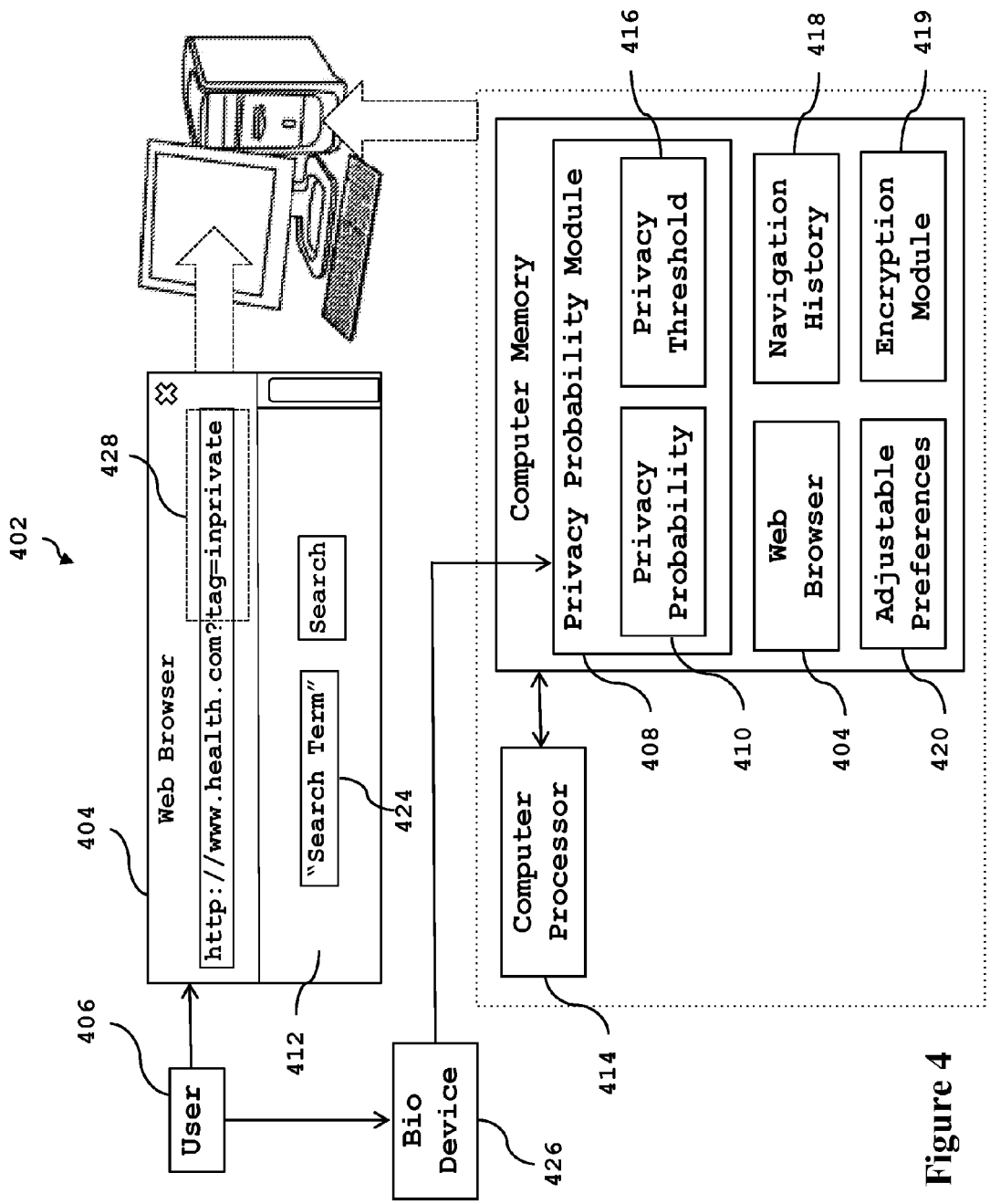
FIG. 4 shows an example embodiment of a system for operating a web browser by a user that may include a privacy probability module.

FIG. 4 shows an example embodiment of a system 402 for operating a web browser 404 by a user 406. The browser 404 may include an open browsing mode and a private browsing mode. In one embodiment, system 402 includes a privacy probability module 408 configured to calculate a privacy probability 410 that a website 412 contains information sensitive to the user 406. The privacy probability 410 may be based, at least in part, on historical use of the private browsing mode by the user 406. An example embodiment of a system 402 may also include a computer processor 414 configured to compare the privacy probability 410 to a privacy threshold 416 and automatically switch the browser 404 from the open browsing mode to the private browsing mode for the website 412 if the privacy probability 410 is greater than the privacy threshold 416.

System 402 may include a browser navigation history 418. In one embodiment, in the open browsing mode, the browser navigation history 418 is not be encrypted, and in the private browsing mode, the browser navigation history 418 is encrypted. System 402 may include an encryption module 419 configured to store the browser navigation history 418 in an encrypted database during private browsing mode. The encryption module 419 may be configured to at least delete the browser navigation history 418, at least in part, after a specified period of time or delete the browser navigation history 418 during an unauthorized attempt to access the browser navigation history. In one embodiment, in the open browsing mode, the browser navigation history 418 is automatically saved, and in the private browsing mode, the browser navigation history 418 is automatically deleted. The browser navigation history 418 may include but is not limited to a list of websites visited, temporary Internet files, downloaded files, form data, cookies, usernames and passwords. Those of ordinary skill in the art will recognize the browser navigation history 418 may include a variety of information according to the needs of the user 406 and functionality of the web browser 404.

In one embodiment of system 402, the historical use of the private browsing mode is based on, at least in part, a set of adjustable preferences 420. In particular, the application of the private browsing mode over past and current browser navigation history may be based on, at least in part, the set of adjustable preferences 420. For example, a user may be able to set the privacy criteria/threshold manually by adjusting preferences. Furthermore, the system can retrospectively revise browsing history based on new preference/privacy criteria/threshold settings. In this case, the new setting causes deletion and/or encryption of past browsing history to meet the new criteria. This deletion and encryption may include the website currently being viewed, in which case, the user would enter in private mode immediately after adjusting preferences. This feature can be useful when a user, at some point, realizes that the current site is not one for which he would like to retain a history of.

In one embodiment of system 402, calculation of the privacy probability 410 includes receiving a search term 424 typed by the user 406. The calculation of the privacy probability 410 may include receiving a signal from a device 426 measuring a biological response from the user 406. In one embodiment of system 402, calculation of the privacy probability 410 includes receiving a code 428 indicating that the website 412 is to be viewed in the private browsing mode.

Figure 5:
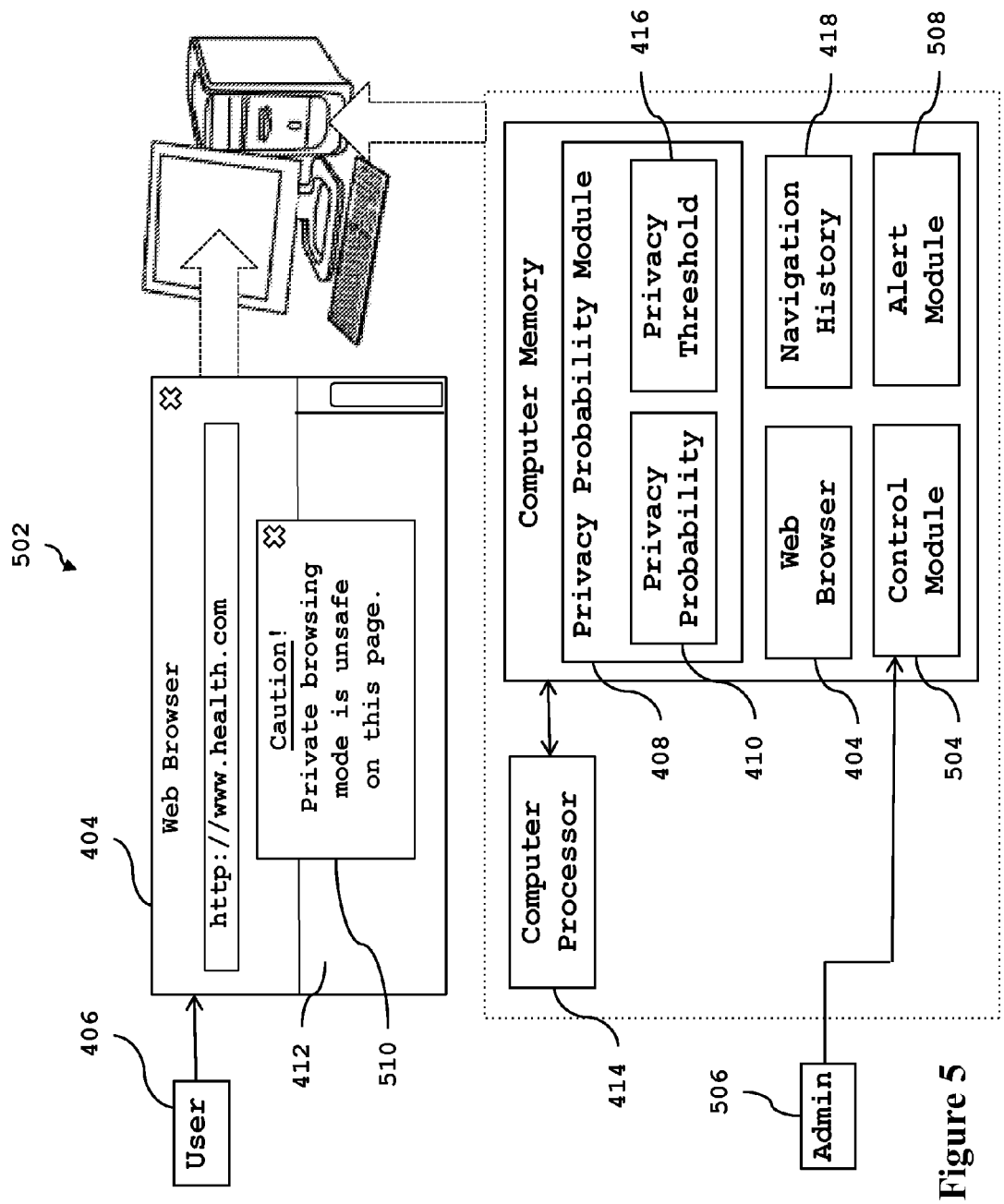
FIG. 5 shows an example embodiment of a system for operating a web browser by a user that may include an external control module.

FIG. 5 shows another example embodiment of a system 502 similar to system 402 shown in FIG. 4. In one embodiment, system 502 may include an external control module 504 configured to disable the browser 404 from switching from the open browsing mode to the private browsing mode based on criteria defined by an administrative user 506. The system 502 may include a privacy alert module 508 configured to alert the user when the private browsing mode may be unsafe. The safety of private browsing mode may be evaluated based on a capability of a server to record information related to the user's visit to the website. An example of an alert 510 is a popup dialogue box in the web browser 412. Those of ordinary skill in the art will recognize a variety of other appropriate ways to alert the user may be used by the present invention.

FIG. 6 shows an example embodiment of a system 602 similar to system 402 shown in FIG. 4. In one embodiment, system 602 includes a permission module 604 configured to prompt the user 406 for permission to switch the browser 404 from the open browsing mode to the private browsing mode. This prompting may be performed before automatically switching the browser from the open browsing mode to the private browsing mode. An example of a permission prompt 606 is a popup dialogue box in the web browser 412. Those of ordinary skill in the art will recognize a variety of other appropriate ways to obtain permission from the user may be used by the present invention.

In one example scenario, a user may be browsing the Web and searching for Web pages related to a personal health issue. He enters the search term "strabismus" (an eye condition). The privacy probability module may determine that in the past the user has always selected a private browsing mode when searching this health term. Thus, the browser may enter private browsing mode automatically based on this pattern of user behavior. In another example, the privacy module analyzes the words on the web page and detects that the topic of a web page is "strabismus" and thus enters private browsing mode.

Note that sensitive search terms may be supplied by the user and/or a third party. Additionally, the target web sites to be associated with private browsing mode may be supplied by the user and/or a third party. Physiological measures may include galvanic skin response, eye motions, pulse rate, facial expression, voice pitch and/or other similar measures. A learning module may be supplied that learns the user's habits.

In addition, there may be a learning phase whereby the system learns from the user which words should trigger private mode. This may have two components. In the first component, the user may be presented with certain keywords and have him or her mark if these keywords are private or not. In addition, a list of keywords may be marked "always private." In the second component, there may be a list of users and privacy settings stored in a database. These lists of users may be clustered into different groups depending on their keywords and privacy settings. Using information from a new user, the user may be matched against all clusters to come up with the best match. The set of these keywords from the cluster may be used to enhance the users privacy settings.

This also may permit a probabilistic method for generating scores on keywords. If the user enters a word with a high confidence association with private browsing mode, the browser may immediately enter private browsing mode. Otherwise, if the user enters a new word, or a word with a lower confidence association, the system may query the user directly to determine if he or she would like to enter into private browsing mode. The database and clusters may be constantly updated given new users, privacy keywords, and answers to such queries.

In addition to the system having the ability to learn from a user's own history of private browsing mode uses and invocations, the system may also be able to learn from the uses of others. For example, if 90% of other users enter private browsing mode when browsing for jobs or medical topics, the user may conveniently request that his own browser enter private browsing mode for these typical uses (or this may automatically occur for the user). Additionally, a user may select from a GUI (or invoke profiles) that allow the user to enter private browsing mode for "clusters" of pre-defined topics, such as "medical topics and job searches." These cluster identifiers may be stored in profiles on the user's local storage or in a remote server.

In some instances, users may encounter sites that, through various methods, subvert private browsing mode browsing and allow other security servers to record which sites a user has visited, even while in private browsing mode. To protect the privacy of such users, the disclosed system may automatically warn a user that a site has been flagged for private browsing mode and that private browsing mode may not guarantee privacy in this instance. Users may then choose to either proceed or not.

Specifically, this configuration may allow that when a user enters search words, links to sites or documents that are returned may be indicated as belonging to one of three categories, for example: (1) open browsing mode sites indicated in black text, (2) suggested private browsing mode sites with privacy assured, indicated in blue text, and (3) suggested private browsing mode sites with privacy not assured, indicated in red text.

In another example, a user may receive a link to a website by instant message or email. The sender of this link might like the site to which the link points to only be browsed while in private browsing mode. The link may include an html tag that may be interpreted by the web browser to automatically force it into private browsing mode browsing. The link may, for example, appear as follows:
http://sprott.physics.wisc.edu/pickover/home.htm?tag=inprivate, where "?tag=inprivate" is the embedded tag. Alternately, the tag may be hidden or encrypted within the link to prevent a receiver from stripping it out.

Note that this may mean that entering or leaving private browsing mode may be controlled by a tag associated with a URL or by other means that are controlled by the web site being browsed. For example, a health website signals a user's browser to enter private browsing mode.

In other embodiments, the private browsing mode of any browser within a physical location (or when a certain IP address is detected) may be triggered, and the mode may be disabled (e.g., disallowed for use) through either wireless means, and/or by reference to a database of such locations while in this location. For example, an employer may prefer that an employee not use private browsing mode between the hours of 9:00 to 5:00.

Additionally, the private browsing mode does not have to actually delete a user's information but instead may save it in a lock box (e.g., database or other storage), just in case a user someday wants his or her browser history for a particular browsing session (e.g., password protection). Also, the lock box may delete information after a period of time. The lock box may delete information if it detects another user is trying to access. Additionally, shuttling of information in and out of the lockbox may be controlled. Note that private browsing mode may not necessarily require the storing and subsequent deletion of user information. Private browsing mode may simply not cause the retention of any information, as would be customary for open browsing mode. However, the lockbox can be used to securely store some user information when using private browsing mode.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preferred embodiments to the invention have been described, it will be understood that those skilled in the art, both now and in the future, may make various improvements and enhancements that fall within the scope of the claims which follow. These claims should be construed to maintain the proper protection for the invention first described.

What is claimed is:

1. A method for operating a web browser by a user, the browser including an open browsing mode and a private browsing mode, the method comprising:
    calculating, by a computer processor, a privacy probability that a website contains information sensitive to the user, the privacy probability based, at least in part, on historical use of the private browsing mode by the user;
    comparing the privacy probability to a privacy threshold; and
    automatically switching the browser from the open browsing mode to the private browsing mode for the website if the privacy probability is greater than the privacy threshold.

2. The method of claim 1, wherein in the open browsing mode a browser navigation history is not encrypted and in the private browsing mode the browser navigation history is encrypted.

3. The method of claim 2, wherein in private browsing mode the browser navigation history is stored in an encrypted database, wherein the database is configured to delete the browser navigation history, at least in part, after a specified period of time and deleting the browser navigation history during an unauthorized attempt to access the browser navigation history.

4. The method of claim 1, wherein in the open browsing mode a browser navigation history is automatically saved and in the private browsing mode the browser navigation history is automatically deleted.

5. The method of claim 1, wherein the application of the private browsing mode over past and current browser navigation history is based on, at least in part, a set of adjustable preferences.

6. The method of claim 1, further comprising:
    prompting the user for permission to switch the browser from the open browsing mode to the private browsing mode before automatically switching the browser from the open browsing mode to the private browsing mode.

7. The method of claim 1, wherein calculating the privacy probability includes receiving a search term typed by the user.

8. The method of claim 1, wherein calculating the privacy probability includes receiving a signal from a device measuring a biological response from the user.

9. The method of claim 1, wherein calculating the privacy probability includes receiving a code indicating that the website is to be viewed in private browsing mode.

10. The method of claim 1, further comprising:
    disabling the browser from switching from the open browsing mode to the private browsing mode based on criteria defined by an administrative user.

11. A system for operating a web browser by a user, the browser including an open browsing mode and a private browsing mode, the system comprising:
- a privacy probability module configured to calculate a privacy probability that a website contains information sensitive to the user, the privacy probability based, at least in part, on historical use of the private browsing mode by the user; and
- a computer processor configured to compare the privacy probability to a privacy threshold and automatically switch the browser from the open browsing mode to the private browsing mode for the website if the privacy probability is greater than the privacy threshold.

12. The system of claim 11, further comprising:
- a browser navigation history, wherein in the open browsing mode the browser navigation history is not encrypted and in the private browsing mode the browser navigation history is encrypted.

13. The system of claim 11, further comprising:
- a browser navigation history, wherein in the open browsing mode the browser navigation history is automatically saved and in the private browsing mode the browser navigation history is automatically deleted.

14. The system of claim 11, wherein the application of the private browsing mode over past and current browser navigation history is based on, at least in part, a set of adjustable preferences.

15. The system of claim 11, further comprising:
- a permission module configured to prompt the user for permission to switch the browser from the open browsing mode to the private browsing mode before automatically switching the browser from the open browsing mode to the private browsing mode.

16. The system of claim 11, wherein calculation of the privacy probability includes receiving a search term typed by the user.

17. The system of claim 11, wherein calculation of the privacy probability includes receiving a signal from a device measuring a biological response from the user.

18. The system of claim 11, wherein calculation of the privacy probability includes receiving a code indicating that the website is to be viewed in the private browsing mode.

19. The system of claim 11, further comprising:
- an external control module configured to disable the browser from switching from the open browsing mode to the private browsing mode based on criteria defined by an administrative user.

20. The system of claim 11, further comprising:
- a privacy alert module configured to alert the user when the private browsing mode is unsafe based on a capability of a server to record information related to the user's visit to the website.

21. A computer program product for operating a web browser by a user, the browser including an open browsing mode and a private browsing mode, the computer program product comprising:
- a non-transitory computer readable storage medium having computer readable program code embodied therewith, the computer readable program code configured to:
  - calculate, by a computer processor, a privacy probability that a website contains information sensitive to the user, the privacy probability based, at least in part, on historical use of the private browsing mode by the user;
  - compare the privacy probability to a privacy threshold; and
  - automatically switch the browser from the open browsing mode to the private browsing mode for the website if the privacy probability is greater than the privacy threshold.

22. The computer program product of claim 21, wherein in the open browsing mode a browser navigation history is not encrypted and in the private browsing mode the browser navigation history is encrypted.

23. The computer program product of claim 21, wherein the computer readable program code is further configured to:
- prompt the user for permission to switch the browser from the open browsing mode to the private browsing mode before automatically switching the browser from the open browsing mode to the private browsing mode.

24. The computer program product of claim 21, wherein the computer readable program code is further configured to:
- receive a search term typed by the user to calculate the privacy probability.

25. The computer program product of claim 21, wherein the computer readable program code is further configured to:
- receive a code indicating that the website is to be viewed in private browsing mode to calculate the privacy probability.

* * * * *